(No Model.)
S. B. MINNICH.
CENTERING MACHINE.
No. 387,901. Patented Aug. 14, 1888.
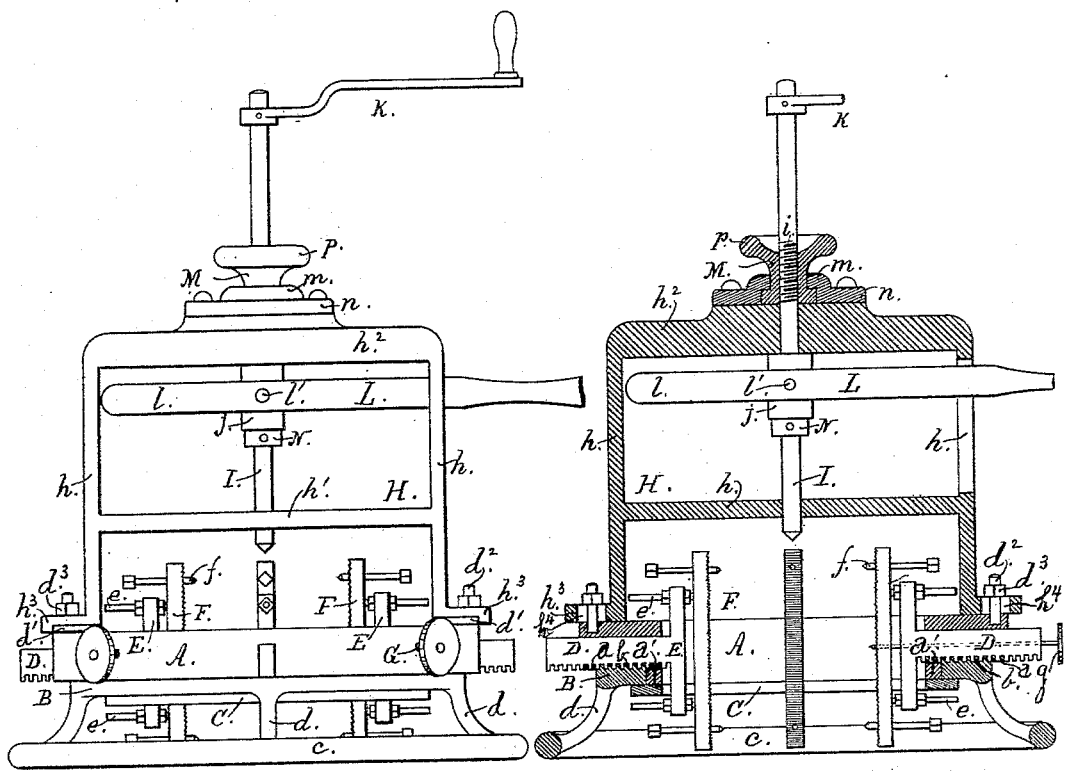
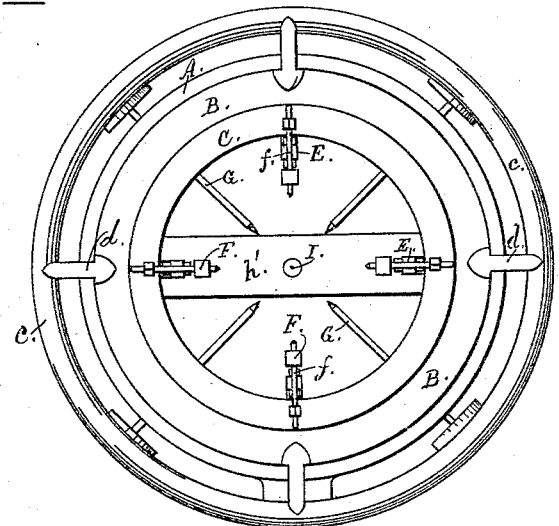
Witnesses,
Harry B. Cochran.
Geo. A. Lane.
Inventor.
Simon B. Minnich.
By his Attorney Wm. R. Gerhart

United States Patent Office.

SIMON B. MINNICH, OF LANDISVILLE, PENNSYLVANIA, ASSIGNOR TO JACOB M. GREIDER, OF SAME PLACE.

CENTERING-MACHINE.

SPECIFICATION forming part of Letters Patent No. 387,901, dated August 14, 1888.

Application filed July 16, 1887. Serial No. 244,540. (No model.)

*To all whom it may concern:*

Be it known that I, SIMON B. MINNICH, a citizen of the United States, residing at Landisville, in the county of Lancaster and State of Pennsylvania, have invented certain Improvements in Centering-Machines, of which the following is a specification.

This invention relates to improvements in portable hand centering-machines; and the object of my improvement is to attach a bit-carrying frame to the face of a chuck in such manner that when said chuck is engaged with the shaft or bar which is to be operated upon the bit may be used for centering or boring the same. I accomplish this object by the mechanism illustrated in the accompanying drawings, in which—

Figure 1 is a top view of my invention; Fig. 2, a horizontal section of the same, and Fig. 3 a view of the back face of the chuck.

Similar letters indicate like parts throughout the several views.

In explaining my invention I use a scroll-chuck composed of the plate A and rings B and C. The plate A is supplied with a flange, $a$, on the outer edge of the inner face, and another, $a'$, around the central opening of the plate. In the same face of the plate there are radial grooves in which the four slides D work freely. The ring B rests in the groove formed by the flanges $a\ a'$, the depth of the flanges being equal to the thickness of the ring B. There is a spiral thread, $b$, cut on the inner face of the ring B, which engages counterparts of the same provided on the faces of the slides, which, when in position, are in contact with the face of the ring B. The ring C, with the opening through its center coinciding with the openings through the plates A and ring B, is screwed to the face of the flange $a'$ to keep the ring B in place. The ring B is provided with a hand-wheel, $c$, secured to it by arms $d$. By revolving the ring B while the body of the chuck is at rest the four slides are made simultaneously to advance or recede from the center of the chuck with an equal velocity.

The slides D have arms E attached to their inner ends parallel with the axis of the chuck, to which are attached clamps F, lying in the same radial plane, by means of set-screws $e$, each clamp being supported by two screws—one at each end of its corresponding arm.

The clamps have pointed set-screws $f$ at each end, which, after the work is gripped by the clamps, are screwed down, so that the points prick into the metal to prevent longitudinal motion. For the same purpose screws G of similar character work through the radial perforations in the plate A. If preferable, these screws may be located in openings through the slides D and down through the clamps F, as shown at $g$, Fig. 2.

To support the bit I, there is a frame, H, fastened to the plate A. This frame is composed of two side bars, $h$, extending outward from the plate parallel with the axis of the chuck and connected by two cross-bars, $h'$ and $h^2$. The cross-bars have openings through them opposite the center of the chuck, in which the bit is supported. The frame H is secured to the chuck by the arms $h^3$ of the bars $h$, which rest between two flanges, $d'$, on each side of the plate, and are held in place by nuts $d^3$, working on screw-bolts $d^2$, projecting from the face of the plate A and passing through slots $h^4$ in the arms $h^3$. This method of securing the frame permits it to be adjusted transversely, so that the tool may be made to operate outside of the center line of the shaft.

As before mentioned, the bit rests in the openings through the cross-bars $h'$ and $h^2$, and it is rotated by the crank K, or any other well-known desirable method. The bit is fed forward by a feed-lever, L, embracing the loose sleeve $j$ on said bit between its jaws $l$ and pivoted to the said sleeve by set-screw $l'$. In feeding the bit forward the lever is thrown toward the chuck, thus engaging the jaws $l$ with the cross-bar $h^2$ and forcing the sleeve $j$ forward against a rigid collar, N, adjustable longitudinally on the spindle to regulate the length of its throw. The tool or bit support is thus attached to the chuck at a distance from the face of the plate A, that the end of the shaft to be centered may be passed through and beyond the jaws far enough to prevent the latter from coming in contact with the burr on the end of the shaft when they are closed upon it.

If preferable, the screw-feed shown may be used. It consists, substantially, of the female-threaded sleeve M, located outside of the bar $h^2$ and engaging the thread $i$ on the bit, and is held in place by the collar $m$ on the lug $n$, detachably secured to the bar $h^2$. The sleeve M is rotated by the hand-wheel $p$.

In order to secure this machine in a vise or other similar device, one side of the plate A is provided with a square lug, R, to afford bearing for a secure grip.

The operation of this centering-machine will be readily understood. The chuck is secured in a vise, and the rod to be operated upon is inserted in the opening through the same until the end approaches the cross-bar $h'$, when it is secured in position by closing the clamps upon it, longitudinal motion being prevented by turning down the screws $f$ or G until their points prick into the metal of the rod, after which it is operated upon by the tool, as described; or the chuck is carried to the rod, if heavy or stationary, and the instrument pushed on the same with the chuck foremost, the rod passing through the opening in said chuck, as in the first case.

Having thus described my invention, what I claim as new, and desire to secure by Letters Patent, is—

1. The combination, with the chuck and the bit-supporting frame, of means for adjustably securing said frame to the face of the chuck, for the purpose specified.

2. The combination, with the chuck and the bit-supporting frame projecting in front of the face thereof, of arms $h^3$, projecting from the bars $h$ of the supporting-frame, channels formed on said chuck and arranged to receive the arms $h^3$, and means for adjustably securing said arms in the channels, substantially as and for the purpose specified.

3. The combination, with a chuck having a tool-supporting frame attached thereto, of the screws G, passing through the body of said chuck to prevent longitudinal movement of the same, substantially as specified.

SIMON B. MINNICH.

Witnesses:
M. N. BRUBAKER,
WM. R. GERHART.